June 3, 1952  H. C. BENTLEY ET AL  2,598,670
FILING SPOUT
Filed April 1, 1946  2 SHEETS—SHEET 1
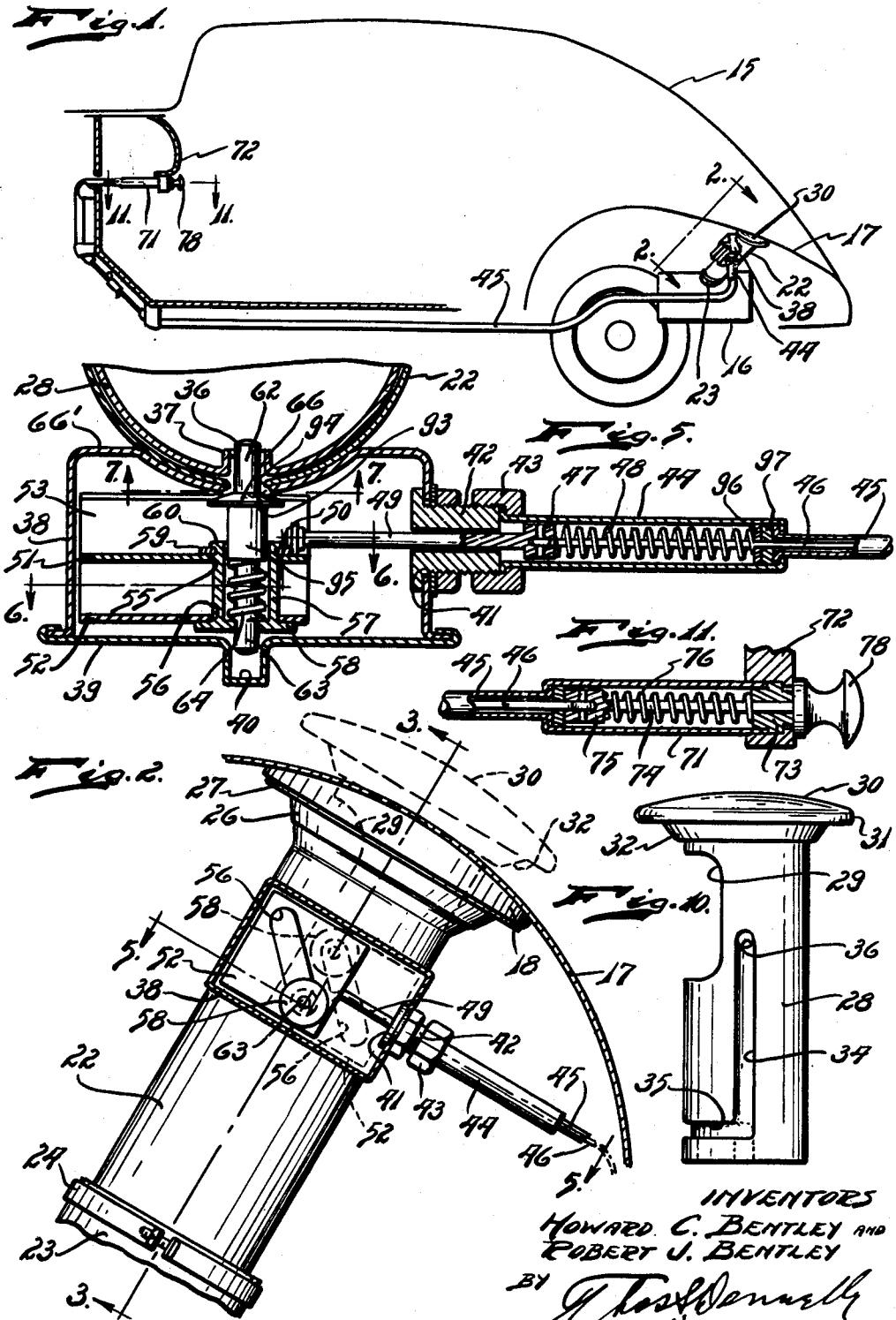
INVENTORS
HOWARD C. BENTLEY AND
ROBERT J. BENTLEY
BY
ATTORNEY

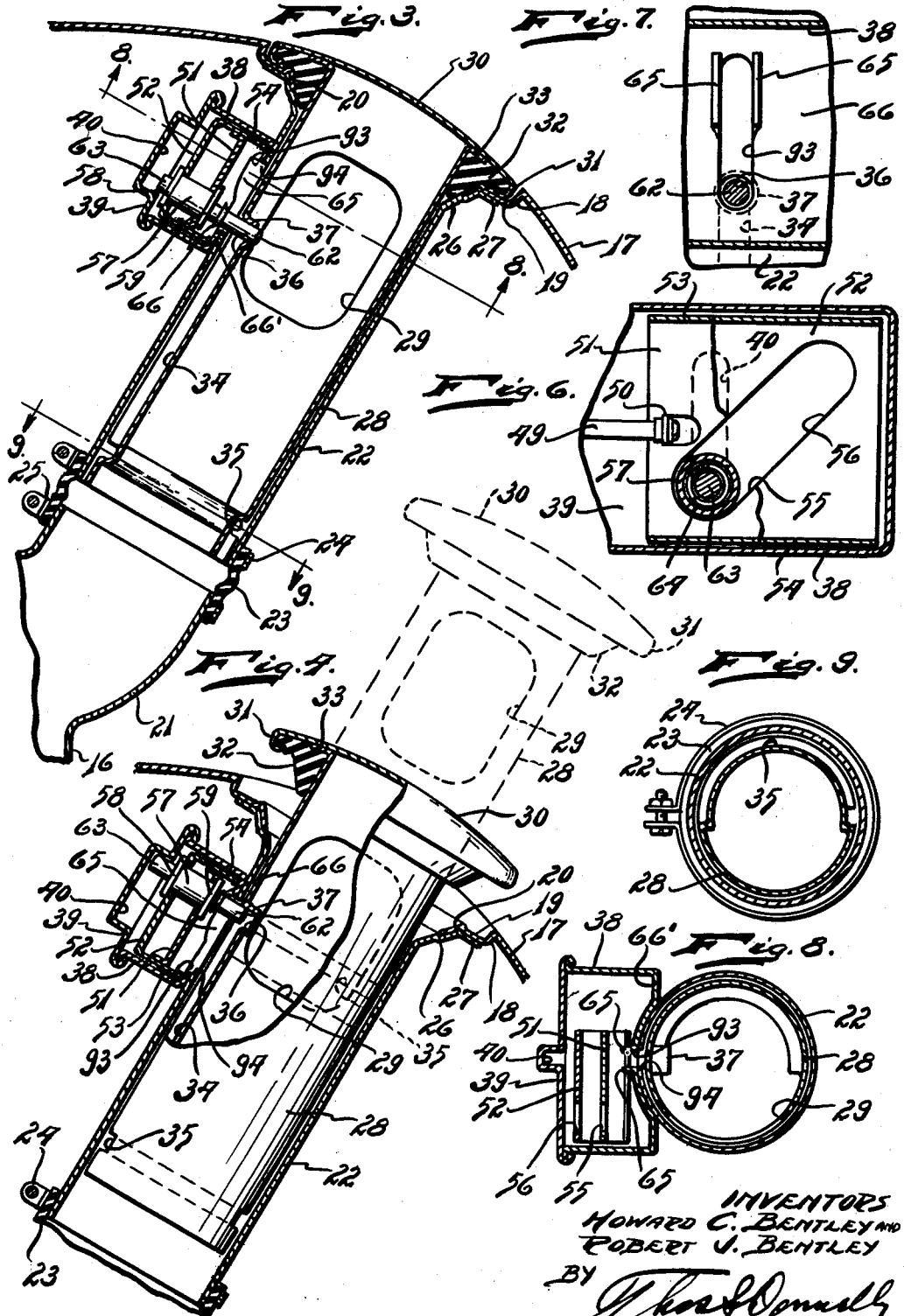

Patented June 3, 1952

2,598,670

UNITED STATES PATENT OFFICE 2,598,670

FILLING SPOUT

Howard C. Bentley, Detroit, and Robert J. Bentley, Monroe, Mich.; Rose Bentley, Monroe, Mich., special administratrix of said Robert J. Bentley, deceased Application April 1, 1946, Serial No. 658,654

6 Claims. (Cl. 220—86)

1

Our invention relates to a new and useful improvement in a filling spout adapted for use on fuel tanks on automobiles and the like. The invention relates to that class of filling spouts in which a pair of telescoping tubes are used, one of the tubes being extendable outwardly from the other and having an opening formed in its side into which the nozzle of the filling hose may be inserted. The filling spout is so constructed and arranged that until the opening bearing tube is extended access to the fuel tank through the filling spout cannot be obtained.

It is an object of the present invention to provide a filling spout of this class so arranged and constructed that the extendable tube may be secured against extention so as to render access to the fuel tank through the filling spout unobtainable.

Another object of the invention is the provision in a filling spout having a pair of tubes one of which is extended beyond the other, of a locking means whereby the tubes may be locked against relative movement.

Another object of the invention is the provision of a mechanism whereby the operation of the mechanism will effect an extension of the extendable tube into position where it may be easily gripped by the hand and drawn outwardly to operative position.

Another object of the invention is the provision of means remote from the operating mechanism which may be operated to actuate the operating mechanism to control a relative movement of the filling spout tubes.

Other objects will appear hereinafter.

It is recognized that various modifications and changes may be made in the detail of structure illustrated without departing from the invention itself and it is intended that such variations and modifications shall be embraced within the claims which form a part of this application.

Forming a part of this application are drawings in which,

Fig. 1 is a diagrammatic side elevational view of an automobile showing the invention applied, Fig. 2 is a fragmentary view taken on line 2—2 of Fig. 1, Fig. 3 is a sectional view taken on line 3—3 of Fig. 2, Fig. 4 is a view similar to Fig. 3, showing the parts in different position and with parts broken away, Fig. 5 is a sectional view taken on line 5—5 of Fig. 2, Fig. 6 is a fragmentary sectional view taken on line 6—6 of Fig. 5,

2

Fig. 7 is a fragmentary sectional view taken on line 7—7 of Fig. 5,

Fig. 8 is a sectional view taken on line 8—8 of Fig 3,

Fig. 9 is a sectional view taken on line 9—9 of Fig. 3,

Fig. 10 is a side elevational view of the inner tube used in the invention,

Fig. 11 is an enlarged sectional view taken on line 11—11 of Fig. 1.

In the drawings we have indicated an automobile body 15 associated with which is a fuel tank 16. Projecting outwardly from the fuel tank 16 is a spout 21 as shown in Fig. 3, and connected to this spout 21 is an outer tube 22, the connection being made by the flexible tube 23 and the clamping bands 24 and 25. Formed in the body or fender 17 is an opening and the fender or body 17 is bent inwardly as at 18 and then angularly turned as at 19 and again angularly turned at 20. The tube 22 is provided with the outwardly flared portion 26 terminating in the radial flange 27 which engages the portion 19. The portion 26 engages the portion 20 and these parts may be suitably secured together by welding, brazing or in any other manner.

Slidably mounted in the tube 22 is an inner tube or extension tube 28 having an opening 29 formed intermediate its ends. This tube 28 is shown fully telescoped in Fig. 3, and in Fig. 4, it is shown extended in dotted line. When the tube 28 is fully extended, the opening 29 is exposed to provide a space into which the nozzle of the filling hose may be inserted. The inner tube 28 is provided with a cover 30 the edges of which are crimped at 31 to retain a packing ring 32 of sealing material formed of rubber or the like. This cover 30 engages the outwardly turned flange 33 on the end of the inner tube 28 and is suitably secured thereto by brazing, welding or in any other desired manner. It will be noted from Fig. 3, that when the inner tube 22 is thrust inwardly its full extent so that it is fully collapsed or telescoped, the outer face of the cover 30 forms a continuation of the outer surface of the body or fender 17.

Inner tube 28 is provided with the axially extending groove 34 which terminates at its inner end with a circumferentially extended groove 35. Formed through the inner tube 28 at the upper end of the groove 34 is an opening 36 which is surrounded by the inwardly pressed sleeve 37.

Mounted on the outer tube 22, is a housing 38 provided with a cover 39 having the central portion pressed outwardly to provide the channel or space 40. Secured to and projecting outwardly from an end hole 41 of this housing is a nipple 42. Secured to this nipple 42, by means of the nut 43, is a tube 44 which is connected at its opposite end to the sheathing 45 which encloses a flexible rod or wire 46. This rod 46 projects into the tube 44 and is secured at its inner end to the head 47 of the rod 49. Embracing the wire 46 within the housing or tube 44 is a coil spring 48 one end of which engages against the head 47 and the other end of which engages against a washer 96 bearing against packing 97 which is positioned in the tube 44. The rod 49 is connected to the lug 50 which projects upwardly from the plate 51. As clearly seen in Fig. 4, there is a plate 52 which is associated with the plate 51. This plate 52 has the pair of spaced apart legs 53 and 54 between which the plate 51 engages and to which the plate 51 is attached. Formed in the plate 51 is a diagonally directed slot 55 registering with a similar slot 56 formed in the plate 52. Mounted in these slots 55 and 56 is a barrel 57 having a flange 58 on one end and upset at its opposite end as at 60 over the washer 59. A plunger 95 is mounted for slidable movement into and out of the barrel 57. A stem 63 is carried by the plunger and embraced by the coil spring 64, one end of this coil spring bearing against the bottom of the barrel 57 and the other end bearing against the enlarged portion 95. A stem 62 projects from the enlarged portion 95 and is adapted to project through the opening formed in the outer tube 22. The plunger 95 is provided with the outwardly directed flange 66 having an inclined face on one side to provide a cam surface. The outer tube 22 is provided with a longitudinally directed slot 94 registering with the slot 93 formed in the bottom 66' of the housing 38. The bottom 66' of this housing, at opposite sides of the slot 93, is turned inwardly to provide the cam plates 65. These cam plates taper in height from one end to the other as clearly shown in Fig. 4 and in Fig. 3.

Mounted on the dash 72 or in any other suitable position accessible to the driver of the vehicle, is a fitting 73 on which is mounted the tube 71 to which is secured one end of the sheathing 45. The flexible rod 46 projects into the tube 71 and is connected to a head 75 on the rod 74 which is provided with a knob 78. This rod is embraced by the spring 76 which is positioned within the housing 71 as clearly shown in Fig. 11.

The obstruction is such that when the tubes 28 and 22 are fully collapsed, as shown in Fig. 3, the punger 62 will be in the position shown in Fig. 5, projecting through the opening 36 formed in the inner tube 28 and serving to secure this inner tube 28 against slidable outward or inward movement relatively to the outer tube 22. When an operator of the vehicle by pulling on the knob 78 effects a movement of the rod 46, the rod 49 will be drawn to the right of the position shown in Fig. 5, or to the left of the position shown in Fig. 6. This would cause the plates 51 and 52 to move in unison with each other toward the right from that position which is shown in full line in Fig. 2, into position shown in dotted line. As the slidable movement of the plates 51 and 52 is effected, the barrel 57, carrying with it the plunger 95 and its connected parts, will travel lengthwise of the elongated diagonally directed slots 55 and 56. This will carry the parts from the position shown in Fig. 3, to the position shown in full lines in Fig. 4. This movement is upwardly of the outer tube 22 and, as the upward movement continues, the inclined face of the flange 66 will ride on the inclined edges of the flanges 65 so that the plunger 62 will be retracted against the compression of the spring 64 out of the opening formed in the inner tube 28, but this retraction will not take effect until the inner tube 28 has been moved outwardly into the full line position shown in Fig. 4. When in this position the user of the vehicle may grasp the outer end of the tube 28 and draw it outwardly manually into the dotted line position shown in Fig. 4. In this movement the plunger 62 will ride in the groove 34 and when the end of the groove 34 is reached a slight turning of the inner tube 28 will cause the plunger to engage in the circumferentially directed groove 35 thus retaining the inner tube in its outwardly projected position. When it is desired to again collapse the tube, the inner tube is turned to the position where the plunger 62 will register with the groove 34 and the inner tube 28 may then be thrust inwardly. This inward movement will continue without disturbing the mechanism associated with the housing 38 until the position shown in Fig. 4 is reached, whereupon the inner tube will engage the plunger 62 and then move it downwardly thus effecting a sliding of the plates 51 and 52 to their original position. This sliding movement will, of course, be facilitated by the pressure of the springs 48 and 76.

In this manner we have provided a filling spout with a pair of telescoping parts and a means accessible from the driver's seat whereby the inner tube may be released for movement outwardly and extended outwardly a slight distance to facilitate the gripping of the tube for movement further outwardly.

What we claim as new is:

1. A filling spout construction of the class described comprising an outer tube adapted for communicating with a tank to be filled; an inner tube slidably mounted in said outer tube and having an opening formed therein for insertion of a conduit nozzle; a locking mechanism for locking said inner tube in its inwardly thrust position relatively to said outer tube; means for moving said locking mechanism to un-locking position; and means including cam mechanism for, prior to movement of said locking mechanism to unlocking position effecting an outward movement of said inner tube relatively to said outer tube.

2. A filling spout construction of the class described adapted for use with a tank to be filled and comprising: a spout rigidly connected to said tank in communication therewith and projecting outwardly therefrom; an outer tube; a flexible conduit for connecting the adjacent ends of said spout and said tube; an inner tube slidably mounted in said outer tube and adapted for telescoping fully therewith; a locking mechanism for locking said inner tube in fully telescoped position relatively to said outer tube; and means remote from said locking mechanism operable for moving said locking mechanism to un-locking position; and the means operable by said remote means for moving said inner tube outwardly of said outer tube prior to the movement of said locking mechanism to un-locking position.

3. A filling spout construction of the class described, comprising: an outer tube; an inner tube slidably mounted in said outer tube and having an opening formed therein, said outer tube having a longitudinally directed slot in alignment with said opening; a locking mechanism mounted on said outer tube; a plunger on said locking mechanism projecting inwardly through said slot in said outer tube and into the opening formed in said inner tube for locking said tubes in fixed relation upon fully telescoping of said inner tube in said outer tube; a cam mechanism for moving said inner tube outwardly of said outer tube, said plunger moving in unison with said inner tube and riding in said slot in said outer tube; and a cam mechanism operable upon outward movement of said inner tube relatively to said outer tube a predetermined distance for withdrawing said plunger from said opening.

4. A filling spout construction of the class described, comprising: an outer tube; an inner tube slidably mounted in said outer tube and having an opening formed therein, said outer tube having a longitudinally directed slot in alignment with said opening; a locking mechanism mounted on said outer tube; a plunger on said locking mechanism projecting inwardly through said slot in said outer tube and into the opening formed in said inner tube for locking said tubes in fixed relation upon fully telescoping of said inner tube in said outer tube; a cam mechanism for moving said inner tube outwardly of said outer tube, said plunger moving in unison with said inner tube and riding in said slot in said outer tube; and a cam mechanism operable upon outward movement of said inner tube relatively to said outer tube a predetermined distance for withdrawing said plunger from said opening; and a rod extending remotely from said plunger for actuating said cam mechanism.

5. A filling spout construction of the class described, comprising: an outer tube; an inner tube slidably mounted in said outer tube and adapted for fully telescoping therewith and having an opening formed therethrough communicating with the longitudinally extended slot formed in said outer tube; a locking mechanism mounted on said outer tube; a plunger on said locking mechanism projectable inwardly through said slot and into the opening formed in said inner tube for locking said tubes in fixed relation upon fully telescoping of said inner tube in said outer tube; cam mechanism for moving said inner tube outwardly of said outer tube and effecting movement of said plunger longitudinally of said outer tube; a manually operable rod extending remote from said plunger for operating said cam mechanism; and cam mechanism operable upon outward movement of said inner tube a predetermined distance relatively to said outer tube for withdrawing said plunger from said opening.

6. A filling spout construction of the class described comprising an outer tube; an inner tube slidably mounted in said outer tube and adapted for fully telescoping therein and having an opening formed therethrough communicating with an axially directed peripheral groove formed on said inner tube, said peripheral groove communicating with a circumferential groove formed on said inner tube adjacent its inner end, said outer tube having a longitudinally directed slot in alignment with said opening; a locking mechanism mounted on said outer tube; a plunger on said locking mechanism projecting inwardly through said slot in said outer tube through the opening formed in said inner tube for locking said tubes in fixed relation upon fully telescoping of said inner tube in said outer tube; a cam mechanism for moving said inner tube outwardly of said outer tube, said plunger moving in unison with said inner tube and riding in said slot in said outer tube; a cam mechanism operable upon an outward movement of said inner tube for withdrawing said plunger from said opening, and, upon further outward movement of said inner tube, the inner end of said plunger engages and rides in said axially directed groove.

HOWARD C. BENTLEY.
ROBT. J. BENTLEY.

REFERENCES CITED

The following references are of record in the file of this patent:

UNITED STATES PATENTS

| Number | Name | Date |
| --- | --- | --- |
| 1,296,742 | Bevington | Mar. 11, 1919 |
| 1,451,899 | Coogan | Apr. 17, 1923 |
| 1,834,837 | Hashimoto | Dec. 1, 1931 |
| 1,958,019 | Reasoner | May 8, 1934 |
| 1,997,107 | Cullinan | Apr. 9, 1935 |
| 2,259,814 | Green et al. | Oct. 21, 1941 |
| 2,409,532 | Bentley et al. | Oct. 15, 1946 |

FOREIGN PATENTS

| Number | Country | Date |
| --- | --- | --- |
| 505,384 | Great Britain | May 10, 1939 |
| 522,459 | Germany | Apr. 9, 1931 |
| 790,419 | France | Sept. 9, 1935 |